US007773525B2

(12) United States Patent
Fujino

(10) Patent No.: US 7,773,525 B2
(45) Date of Patent: Aug. 10, 2010

(54) MOBILE COMMUNICATION CONTROL METHOD, MOBILE COMMUNICATION SYSTEM, ROUTER, AND PROGRAM

(75) Inventor: Shozo Fujino, Minato-ku (JP)

(73) Assignee: NEC Corporation, Tokyo (JP)

( * ) Notice: Subject to any disclaimer, the term of this patent is extended or adjusted under 35 U.S.C. 154(b) by 1088 days.

(21) Appl. No.: 11/376,236

(22) Filed: Mar. 16, 2006

(65) Prior Publication Data
US 2006/0209697 A1 Sep. 21, 2006

(30) Foreign Application Priority Data
Mar. 17, 2005 (JP) .............................. 2005-077189

(51) Int. Cl.
H04J 1/16 (2006.01)
(52) U.S. Cl. ...................................... 370/238; 370/338
(58) Field of Classification Search ....................... None
See application file for complete search history.

(56) References Cited

U.S. PATENT DOCUMENTS

| 6,535,488 | B1 * | 3/2003 | Mahe .......................... 370/238 |
| 6,625,135 | B1 | 9/2003 | Johnson et al. |
| 7,242,669 | B2 * | 7/2007 | Bundy et al. ................. 370/252 |
| 2003/0174652 | A1 * | 9/2003 | Ebata .......................... 370/235 |
| 2004/0008664 | A1 * | 1/2004 | Takahashi et al. ........... 370/351 |
| 2004/0114558 | A1 * | 6/2004 | Krishnamurthi et al. .... 370/338 |
| 2004/0141477 | A1 | 7/2004 | Xu et al. |
| 2005/0249121 | A1 * | 11/2005 | Matsunaga ................... 370/238 |
| 2005/0259631 | A1 * | 11/2005 | Rajahalme ................... 370/351 |

FOREIGN PATENT DOCUMENTS

| JP | 2002-16636 A | 1/2002 |
| JP | 2003-249951 A | 9/2003 |
| JP | 2004-304257 A | 10/2004 |
| JP | 2005-6264 A | 1/2005 |
| JP | 2005-26941 A | 1/2005 |
| WO | WO 2004/010668 A1 | 1/2004 |

* cited by examiner

Primary Examiner—Phuc Tran
(74) Attorney, Agent, or Firm—Sughrue Mion, PLLC

(57) ABSTRACT

When transmitting or receiving packets of mobile terminals for which movement information is managed by control devices, path costs that result from data-related factors for transmitting and receiving packets are calculated for each of paths that pass by way of the control devices and paths that do not pass by way of the control devices, processing costs that result from control-related factors for transmitting and receiving packets are calculated for each of paths that pass by way of the control devices and paths that do not pass by way of the control devices, the path costs and the processing costs that have been calculated are added for each of the paths that pass by way of the control devices and paths that do not pass by way of the control devices, the path for which the added cost is lowest is selected, and the transmission and reception of packets is carried out using the selected path.

33 Claims, 8 Drawing Sheets

| HoA of Mobile terminal 10a | CoA for Mobile terminal 10a | HoA of Mobile terminal 10b | CoA for Mobile terminal 10b |
|---|---|---|---|
| 2000 :: 1 | 4000 :: 101 | 3000 :: 2 | 3000 :: 102 |

| HA of Home agent 30b | Address of Access router 20b |
|---|---|
| 3000 :: 1001 | 3000 :: 102 |

43 Address information

Fig. 6a

| Route | Number of hops (hop) | Packet size (B) | HA cost |
|---|---|---|---|
| 1 | 800 | 260 | 300 |
| 2 | 550 | 220 | 0 |
| 3 | 900 | 244 | 300 |
| 4 | 200 | 260 | 300 |
| 5 | 650 | 268 | 0 |

Fig. 6b

| Route | Number of messages |
|---|---|
| 1→2→4 or 3→4 | 4 |
| 5 | 14 |

| Reverse Tunnel |
|---|
| present |

HoA/CoA information table of Mobile terminal 10c

| HoA of Mobile terminal 10c | CoA for Mobile terminal 10c | HoA of Mobile terminal 10d | CoA for Mobile terminal 10d |
|---|---|---|---|
| 2000 :: 23 | 4000 :: 201 | 3000 :: 56 | 3000 :: 202 |

‖            ‖       ‖

HoA/CoA information table of Mobile terminal 10a

| HoA of Mobile terminal 10a | CoA for Mobile terminal 10a | HoA of Mobile terminal 10b | CoA for Mobile terminal 10b |
|---|---|---|---|
| 2000 :: 1 | 4000 :: 101 | 3000 :: 2 | 3000 :: 102 |

MOBILE COMMUNICATION CONTROL METHOD, MOBILE COMMUNICATION SYSTEM, ROUTER, AND PROGRAM

BACKGROUND OF THE INVENTION

1. Field of the Invention

The present invention relates to a mobile communication method, a mobile communication system, a router, and a program; and more particularly to a mobile communication control method, a mobile communication system, a router, and a program that employs IP (Internet Protocol) technology.

2. Description of the Related Art

With the development of mobile communication technology in recent years, the standardization of Mobile IPv6 has advanced in the IETF (Internet Engineering Task Force).

FIG. 1 shows an example of the configuration of a mobile communication system of the prior art according to Mobile IPv6.

As shown in FIG. 1, in the present example of the prior art, two home agents 130a and 130b are provided, each home agent having a home core network 131a and 131b, respectively. Communication is realized by means of the transmission and reception of IP packets between mobile terminal 110a, which contracts with the communication provider that has established home agent 130a and for which movement information is managed by home agent 130a, and mobile terminal 110b, which contracts with the communication provider that has established home agent 130b and for which movement information is managed by home agent 130b. Mobile terminal 110a is present within access network 121a that is under the jurisdiction of access router 120a. Mobile terminal 110b is present within access network 121b that is under the jurisdiction of access router 120b. Mobile terminals 110a and 110b each have home addresses (HoA) that are their own IP addresses, and these home addresses (HoA) are registered in home agents 130a and 130b, respectively.

The following explanation regards the method of communication between two mobile terminals 110a and 110b in the mobile communication system shown in FIG. 1.

Explanation first regards the position registration process of mobile terminals 110a and 110b.

When mobile terminal 110a moves from home core network 131a, which is under the jurisdiction of home agent 130a established by the communication provider with which mobile terminal 110a is contracted, or from another access network to access network 121a that is under the jurisdiction of access router 120a, the prefix of the IP address of access router 120a and the MAC address of mobile terminal 110a are used in mobile terminal 110a to generate the care-of Address (CoA) which serves as the IP address of the movement destination. Then, a position registration request (BU: Binding Update) is carried out by sending the combination of the home address of mobile terminal 110a and this care-of address to home agent 130a. A position registration request (BU) is also carried out in the same way in mobile terminal 110b for home agent 130b by using the home address of mobile terminal 110b and the care-of address that has been generated by access network 121b.

In home agent 130a that has received the position registration request (BU) from mobile terminal 110a, the validity of the request is first confirmed, following which the position registration request (BU) is registered in the binding cache (BC) in home agent 130a in association with the home address and care-of address that have been transmitted from mobile terminal 110a and a position registration response (BA: Binding Acknowledgement) that indicates that the position registration has been carried is transmitted to mobile terminal 110a. The position registration of mobile terminal 110b is also carried out in the same way in home agent 130b, and a position registration response (BA) is transmitted to mobile terminal 110b.

In this way, the current positions of mobile terminals 110a and 110b, which have contracted with the communication providers that have established home agents 130a and 130b, respectively, are each managed in home agents 130a and 130b respectively, whereby the movement information of mobile terminals 110a and 110b is managed.

Explanation next regards the process when communication is carried out by the transmission and reception of IP packets between mobile terminals 110a and 110b following implementation of the above-described position registration process, taking as an example a case in which IP packets are transmitted from mobile terminal 110a to mobile terminal 110b. In the following explanation, home addresses of mobile terminals 110a and 110b are "HoA1" and "HoA2," respectively, and the care-of addresses of mobile terminals 110a and 110b are "CoA1" and "CoA2," respectively.

When IP packets are transmitted from mobile terminal 110a to mobile terminal 110b, IP packets for which the origination address is "HoA1" and the destination address is "HoA2" are encapsulated in mobile terminal 110a with "CoA1" as the origination address and the IP address "HA1" of home agent 130a as the destination address, and these encapsulated IP packets are then transmitted from mobile terminal 110a.

Since the destination address of the IP packets that are sent from mobile terminal 110a is the IP address "HA1" of home agent 130a, the IP packets are delivered to home agent 130a by way of access router 120a. Upon reception in home agent 130a of the IP packets that are transmitted from mobile terminal 110a, the encapsulation of the received IP packets is removed: The IP packets for which the origination address is "HoA1" and the destination address is "HoA2" are then transmitted.

The destination address of the IP packets that are transmitted from home agent 130a is "HoA2" and the IP packets are therefore delivered to home agent 130b. Upon receiving the IP packets that have been transmitted from home agent 130a in home agent 130b, the binding cache (BC) in home agent 130b is consulted to find the care-of address "CoA2" of the mobile terminal 110b that is the destination of the IP packets. The received IP packets are then encapsulated with the IP address "HA2" of home agent 130b as the origination address and "CoA2" as the destination address, and the encapsulated IP packets are transmitted from home agent 130b.

The destination address of the IP packets that are sent from home agent 130b is "CoA2", and the IP packets are therefore delivered by way of access router 120b to mobile terminal 110b having the care-of address "CoA2." Upon reception of the IP packets that have been sent from home agent 130b in mobile terminal 110b, the encapsulation of the received IP packets is removed, whereby the IP packets for which the origination address is "HoA1" and the destination address is "HoA2" are received.

In this way, mobile terminals 110a and 110b that have contracted with communication providers that have established home agents 130a and 130b each manage their current positions in home agents 130a and 130b in mobile IPv6. In the event of movement of mobile terminals 110a and 110b, movement transparency is ensured by the transfer of IP packets addressed to mobile terminals 110a and 110b to mobile terminals 110*a* and 110*b* by home agents 130*a* and 130*b*. This technology is disclosed in, for example, JP-A-2005-26941.

The afore-mentioned mobile IPv6 includes a mode for optimizing the communication path between mobile terminals 110*a* and 110*b* that transmit and receive IP packets. The following explanation regards the process when optimizing a communication path.

When IP packets that have been transmitted in from mobile terminal 110*a* are encapsulated in mobile terminal 110*b* with the IP address "HA2" of home agent 130*b* as the origination address and "CoA2" as the destination address, the combination of the home address "HoA2" of mobile terminal 110*b* and the care-of address "CoA2" is transmitted to mobile terminal 110*a* and the position registration request (BU) implemented in mobile terminal 110*b*.

In mobile terminal 110*a* that receives the position registration request (BU) from mobile terminal 110*b*, the validity of the request is first verified, following which the combination of the home address "HoA2" and care-of address "CoA2" of mobile terminal 110*b* is registered in route optimization memory and a position registration response (BA) then transmitted to mobile terminal 110*b*.

When IP packets addressed to mobile terminal 110*b* are subsequently transmitted from mobile terminal 110*a*, IP packets are transmitted in mobile terminal 110*a* with the transmission origin address as "CoA1," the destination address as "CoA2," and "HoA1" added as the home address option. These IP packets are delivered to mobile terminal 110*b* without passing by way of home agents 130*a* and 130*b*.

This optimization of the communication path avoids the occurrence of delay that is produced when a communication path becomes redundant when transmitting and receiving IP packets between mobile terminals 110*a* and 110*b*. This type of technology is disclosed in, for example, JP-A-2005-33469.

In this type of method of optimizing the communication path between mobile terminals 110*a* and 110*b*, however, care-of addresses "CoA1" and "CoA2" that indicate the current positions of mobile terminals 110*a* and 110*b* are reported to the communication partner, whereby one's current location is revealed to the communication partner.

In communication in which the communication path is optimized, an edge mobility technique can be considered in which IP packets that are transmitted and received between mobile terminals 110*a* and 110*b* are encapsulated or decapsulated by access routers 120*a* and 120*b*. In this edge mobility technique, the above-described position registration requests (BU) to home agents 130*a* and 130*b*, the generation of care-of addresses of mobile terminals 110*a* and 110*b*, and the path optimization process are carried out by access routers 120*a* and 120*b* in the place of mobile terminals 110*a* and As a result, the care-of addresses "CoA1" and "CoA2" of mobile terminals 110*a* and 110*b* are managed not by mobile terminals 110*a* and 110*b* but by access routers 120*a* and 120*b*, and in addition, when mobile terminal 110*a* and mobile terminal 110*b* transmit and receive IP packets by the above-described optimized path without passing by way of home agents 130*a* and 130*b*, the care-of addresses "CoA1" and "CoA2" of mobile terminals 110*a* and 110*b* are transmitted and received only between access routers 120*a* and 120*b* and the care-of addresses are not reported to the communication partner, whereby the revelation of one's current location to a communication partner can be avoided.

When optimizing a path to realize communication as previously described, compared to a case in which communication is realized by way of home agents, not only must position registration requests (BU) and position registration responses (BA) to these position registration requests be transmitted and received between mobile terminals and home agents in the control system, but these items of information must further be transmitted and received between the mobile terminals. In addition, return routability (RFC 3775) must be mounted for protecting position registration requests (BU) and position registration responses (BA) between mobile terminals. In addition, when communication is realized in the data system between mobile terminals, the need arises to give a home address option of each of the mobile terminals to the IP packets that are transmitted and received, thereby increasing the packet size of IP packets that are transmitted and received.

As a result, when optimizing a path to realize communication, compared to a case in which communication is realized by way of home agents, despite the avoidance of redundancy of communication path and the reduction of load relating to the routing process, an increase in the costs in the above-described control system and data system detract from any claim of optimization when viewed in terms of total cost.

SUMMARY OF THE INVENTION

It is an object of the present invention to provide a mobile communication control method, a mobile communication system, a router, and a program that enable optimization of the communication path between mobile terminals in terms of cost.

In the present invention, when either of paths that pass by way of control devices or paths that do not pass by way of control devices are used to realize transmission and reception of packets of mobile terminals for which movement information is managed by control devices, path costs that result from data-related factors for transmitting and receiving packets for each of the paths that pass by way of the control devices and paths that do not pass by way of the control devices are calculated, processing costs that result from process-related factors for realizing transmission and reception of packets for each of paths that pass by way of the control devices and paths that do not pass by way of the control devices are calculated, the calculated path costs and processing costs are added for each of the paths that pass by way of the control devices and paths that do not pass by way of the control devices, the path for which the added costs are lowest is selected, and this path is used to realize the transmission and reception of packets.

In this way, the costs entailed on each of paths that pass by way of the control devices and paths that do not pass by way of the control devices, i.e., path-optimized paths are each calculated, and the transmission and reception of packets is realized by way of the path for which the cost is lowest, and as a result, the expenses incurred by users are reduced and the communication path between mobile terminals is optimized in terms of cost.

The above and other objects, features, and advantages of the present invention will become apparent from the following description with reference to the accompanying drawings, which illustrate examples of the present invention.

BRIEF DESCRIPTION OF THE DRAWINGS

FIG. 6a shows the path cost calculation table for calculating the path costs of mobile terminals for each of the paths shown in FIG. 5a;

FIG. 6b shows the processing cost calculation table for calculating the processing costs of mobile terminals for each of the paths shown in FIG. 5a;

FIG. 8a shows the system configuration for explaining the third embodiment of the mobile communication system of the present invention; and FIG. 8b shows the HoA/CoA information table in the access router shown in FIG. 8a.

DETAILED DESCRIPTION OF THE PREFERRED EMBODIMENTS

The following explanation regards the embodiments of the present invention with reference to the accompanying figures.

First Embodiment

Figure 1:
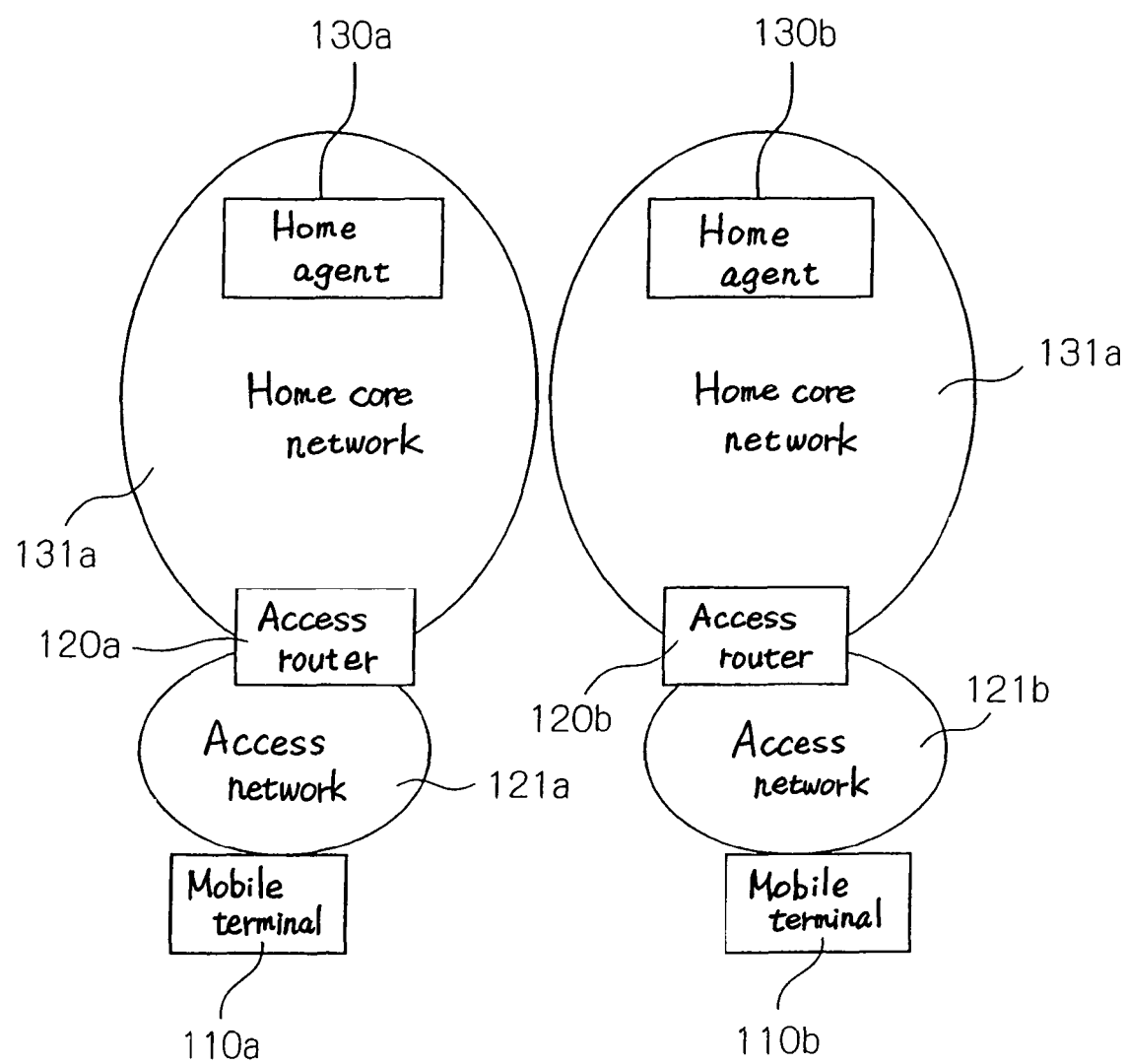
FIG. 1 shows an example of the configuration of a mobile communication system of the prior art that is realized by mobile IPv6.
Figure 2:
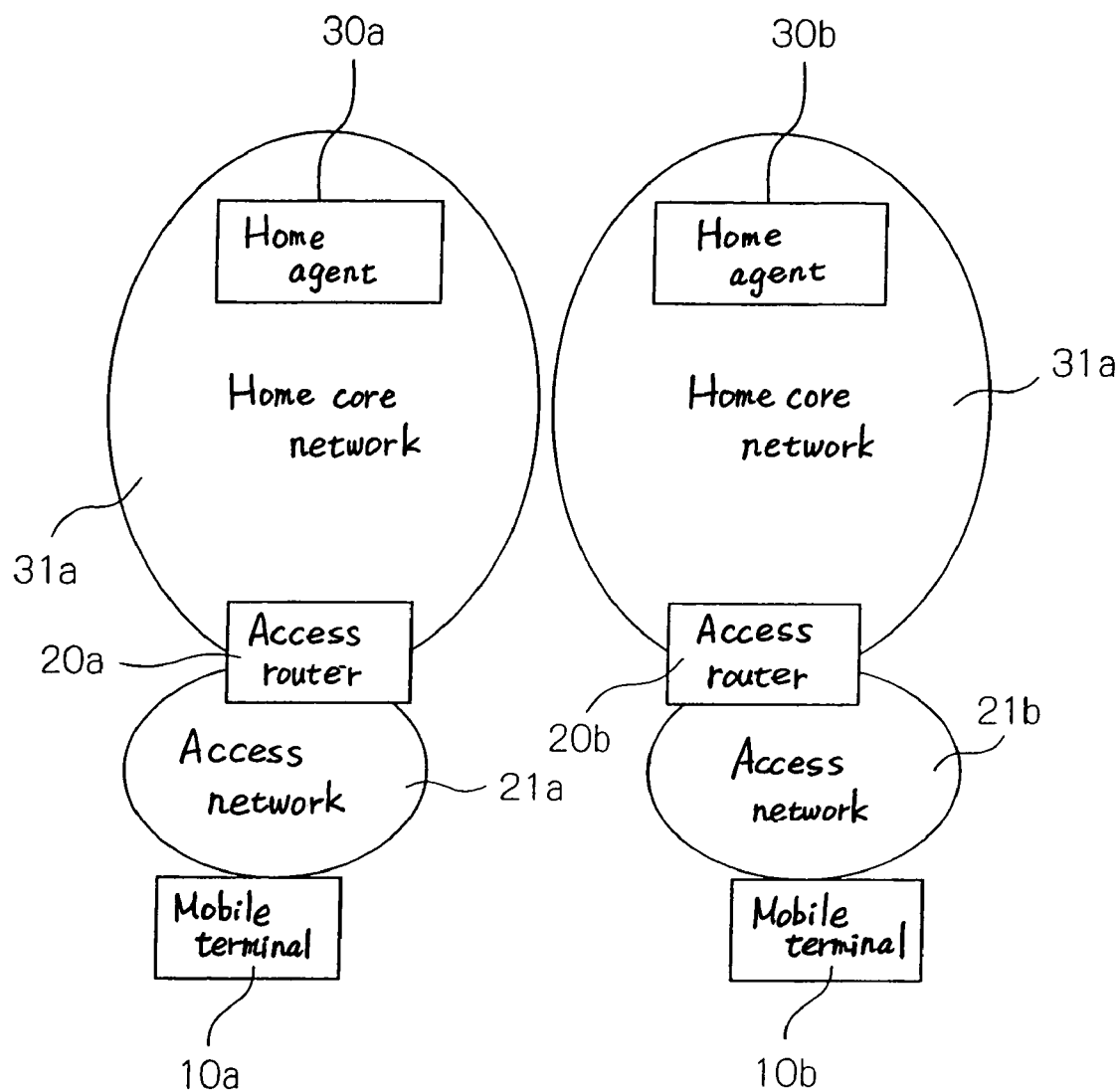
FIG. 2 shows an embodiment of the mobile communication system of the present invention.

FIG. 2 shows an embodiment of the mobile communication system of the present invention.

As shown in FIG. 2, in the present embodiment, two home agents 30a and 30b are established, these home agents being control devices each having respective home core networks 31a and 31b. Communication is then realized by transmitting and receiving packets between mobile terminal 10a, which has contracted with the communication provider that has established home agent 30b and for which movement information is managed by home agent 30a, and mobile terminal 10b, which has contracted with the communication provider that has established home agent 30a and for which movement information is managed by home agent 30b. Mobile terminal 10a is present in access network 21a that is under the jurisdiction of access router 20a, and mobile terminal 10b is present in access network 21b that is under the jurisdiction of access router 20b. Mobile terminals 10a and 10b each have respective home addresses "HoA1" and "HoA2" that are their own IP addresses. In addition, access routers 20a and 20b each have as their own IP addresses the care-of addresses "CoA1" and "CoA2" of mobile terminals 10a and 10b that are present in access networks 21a and 21b, respectively, that are under their jurisdiction.

Figure 3:
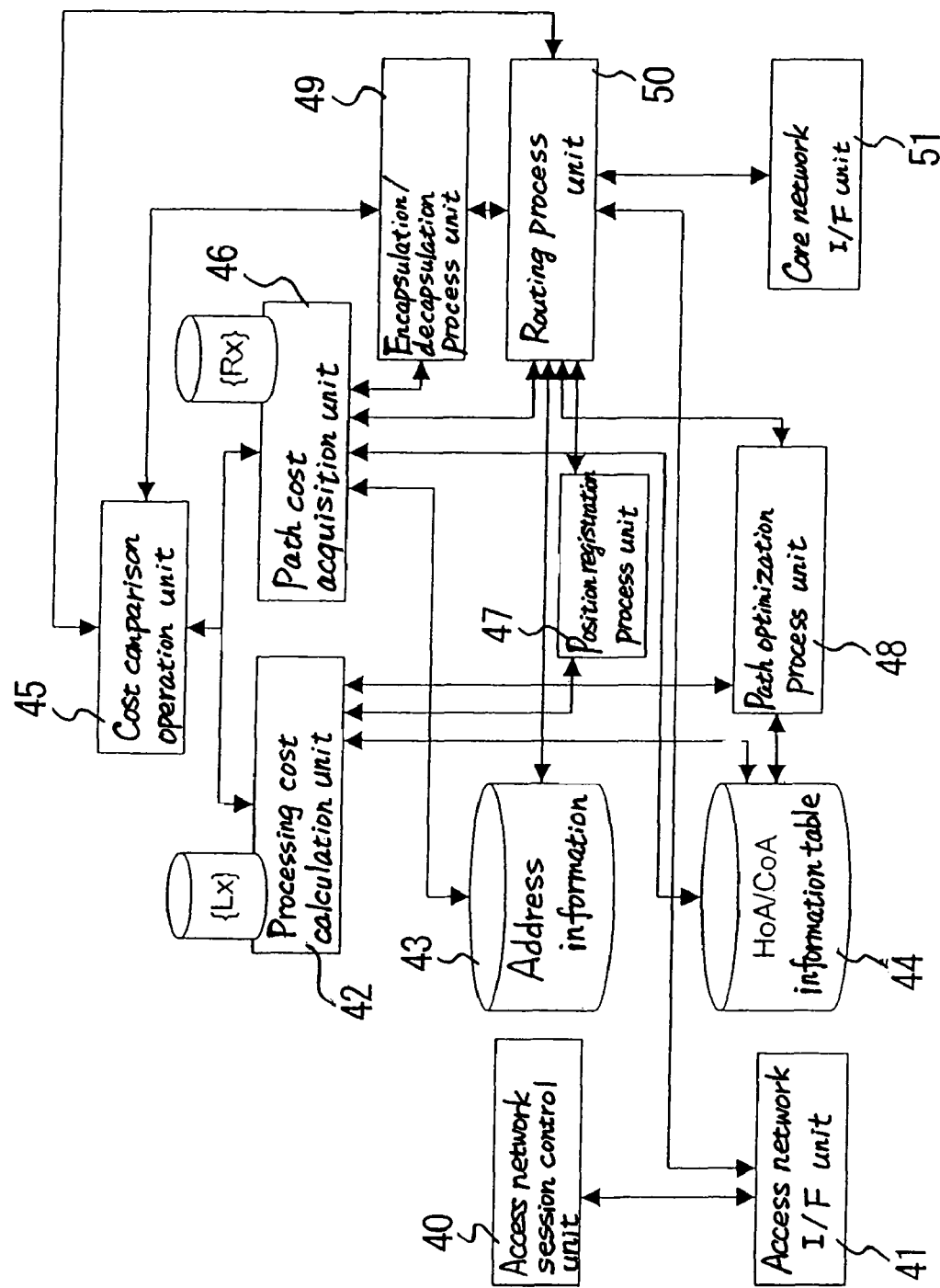
FIG. 3 is a block diagram showing the first embodiment of the access router shown in FIG. 2.

FIG. 3 is a block diagram showing the first embodiment of access router 20a that is shown in FIG. 2.

As shown in FIG. 3, access router 20a in this embodiment of the invention is a device for: maintaining each of the IP addresses of home agents 30a and 30b and access router 20b as address information 43; maintaining HoA/CoA information table 44 that is composed of the home address "HoA1" and care-of address "CoA1" of mobile terminal 10a that is present in access network 21a that is under its jurisdiction and the home address "HoA2" and care-of address "CoA2" of mobile terminal 10b that is the communication partner of mobile terminal 10a; and using these items of information to set the path over which IP packets are transmitted and received between mobile terminals 10a and 10b to one of paths that pass by way of home agents 30a and 30b and paths that do not pass by way of home agents 30a and 30b. Access router 20a is made up from: access network session control unit 40, access network I/F unit 41, processing cost calculation unit 42, cost comparison operation unit 45, path cost acquisition unit 46, position registration process unit 47; path optimization process unit 48, encapsulation/decapsulation process unit 49; routing process unit 50; and core network I/F unit 51. For the sake of simplifying the explanation, the explanation of the present embodiment regards a mobile communication system in which two home agents 30a and 30b are provided, and mobile terminals 10a and 10b that have contracted with the communication providers that have established these home agents 30a and 30b are present in access networks 21a and 21b that are under the jurisdiction of access routers 20a and 20b, respectively; but the present invention is not limited to a network that is formed from only two home agents 30a and 30b and two access routers 20a and 20b, and may be a network that is formed from a plurality of home agents and access routers. In such a case, the access routers maintain address information 43 of the home agents that have been established by the communication providers with which the mobile terminals are contracted and all home agents and access routers that have been established by communication providers that cooperate with these communication providers. In the present embodiment, moreover, only one mobile terminal 10a is present in access network 21a that is under the jurisdiction of access router 20a, but a plurality of mobile terminals may be present. In such a case, access router 20a includes care-of addresses of each of the mobile terminals that are present in access network 21a that is under its jurisdiction as its own IP addresses, and further, maintains HoA/CoA information table 44 for each mobile terminal that is present in access network 21a.

Access network I/F unit 41 is a device for transmitting and receiving IP packets directed to access network 21a. When a session is established with mobile terminal 10a by access network session control unit 40, access network I/F unit 41 transmits and receives IP packets with mobile terminal 10a by way of access network 21a.

Core network I/F unit 51 is a component for transmitting and receiving IP packets directed to home core networks 31a and 31b.

When mobile terminal 10a moves into access network 21a, position registration process unit 47 both generates care-of address "CoA1" for mobile terminal 10a and transmits the combination of this "CoA1" and home address "HoA1" of mobile terminal 10a to home agent 30a that manages the movement information of mobile terminal 10a to thus perform a position registration request (BU).

Path optimization process unit 48 executes a path optimization sequence between mobile terminals 10a and 10b and creates HoA/CoA information table 44 that is composed of home addresses "HoA1" and "HoA2" of mobile terminals 10a and 10b and the care-of addresses "CoA1" and "CoA2" for mobile terminals 10a and 10b.

Processing cost calculation unit 42 calculates the processing costs that result from control-related (C-plane) factors for transmitting and receiving IP packets for each of transmission/reception routes that pass by way of home agents 30a and 30b and transmission/reception routes realized by route optimization that do not pass by way of home agents 30a and 30b. More specifically, the sequential specified total number of control messages that are exchanged is maintained as processing cost calculation table {Lx}, and this number of control messages and a predetermined weighting coefficient are then used to calculate processing costs. Further, in accordance with the operator policies of the communication provider with which mobile terminal 10a has contracted, information is maintained for IP packets that are transmitted from mobile terminal 10a to mobile terminal 10b, this information indicating the presence or absence of reverse tunneling, i.e., whether packets are transmitted by way of only home agent 30b or by way of home agents 30a and 30b.

Path cost acquisition unit 46 is a means for calculating the path costs that result from data-related (U-plane) factors for transmitting and receiving IP packets between mobile terminals 10a and 10b for each of transmission/reception routes that pass by way of home agents 30a and 30b and transmission/reception routes realized by path optimization that do not pass by way of home agent 30a and 30b. Path cost acquisition unit 46: acquires routing costs in home agents 30a and 30b, packet size, and the number of hops between access router 20a and home agent 30a, between home agents 30a and 30b, between access router 20a and home agent 30b, between home agent 30b and access router 20b, and between access routers 20a and 20b; maintains this information as path cost calculation table {Rx}; and uses the information in path cost calculation table {Rx} and a predetermined weighting coefficient to calculate the path costs of IP packets between mobile terminals 10a and 10b on each of transmission/reception routes.

Cost comparison operation unit 45 adds the processing costs that have been calculated in processing cost calculation unit 42 and the path costs that have been calculated in path cost acquisition unit 46 for each transmission/reception route of IP packets between mobile terminals 10a and 10b, compares these added costs, and selects the transmission/reception route that has the lowest cost.

Routing process unit 50 effects control of the routing of IP packets that are transmitted from mobile terminal 10a to mobile terminal 10b and IP packets that are transmitted from mobile terminal 10b to mobile terminal 10a. After a transmission/reception route is selected by cost comparison operation unit 45, routing process unit 50 effects control such that IP packets are transferred via this transmission/reception route.

Encapsulation/decapsulation process unit 49 both encapsulates IP packets that are transmitted from mobile terminal 10a to mobile terminal 10b with care-of addresses "CoA1" and "CoA2" for mobile terminals 10a and 10b and removes the encapsulation of IP packets that have been encapsulated with care-of addresses "CoA1" and "CoA2" and transmitted in from mobile terminal 10b to mobile terminal 10a.

The foregoing explanation regards the configuration of access router 20a, but this explanation can apply to the configuration of access router 20b if mobile terminal 10b is substituted for mobile terminal 10a in the configuration of the above-described access router 20a.

The following explanation regards the mobile communication control method in the mobile communication system that is configured according to the foregoing explanation and takes as an example the process in access router 20a when IP packets are transmitted from mobile terminal 10a to mobile terminal 10b.

Figure 4:
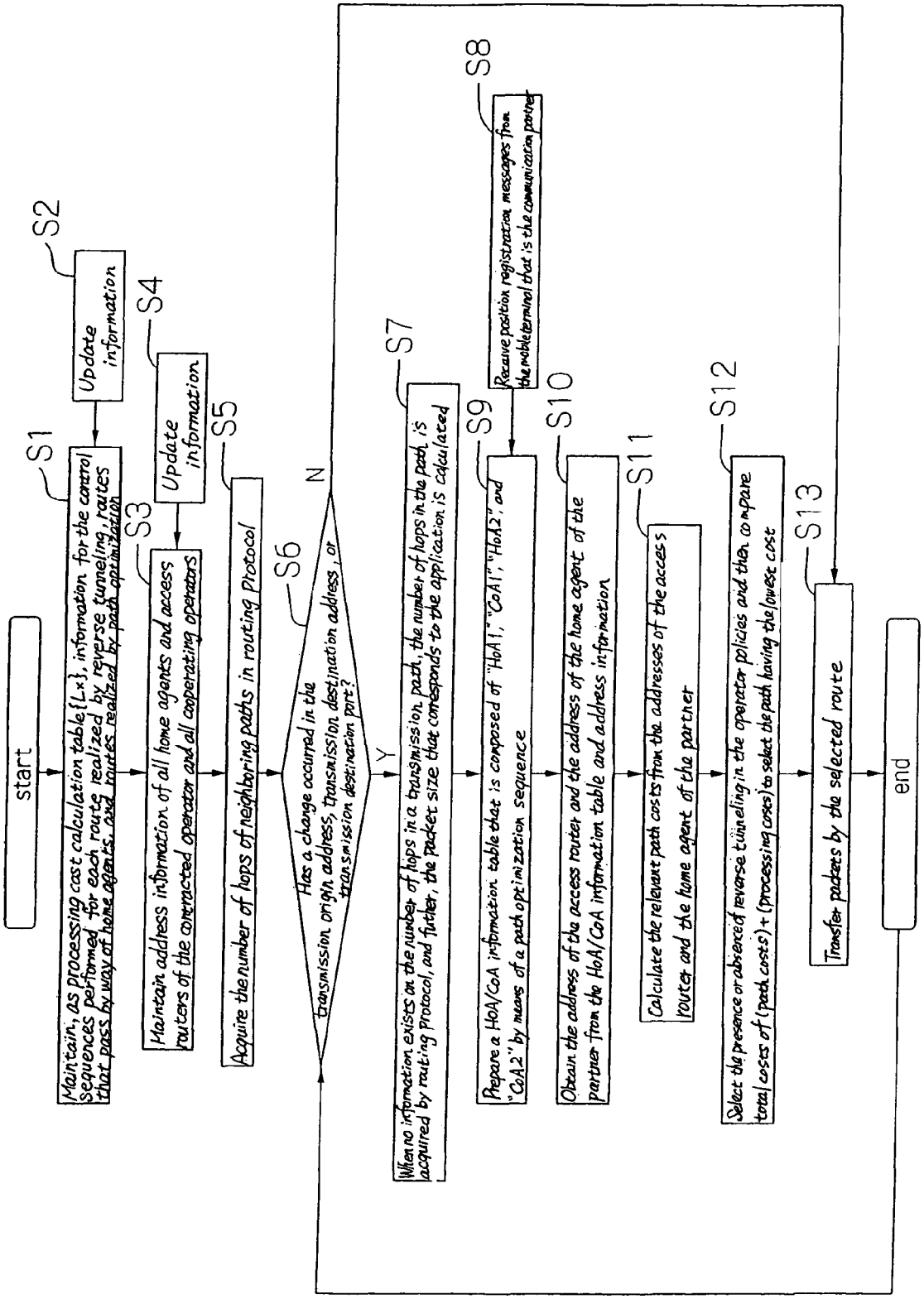
FIG. 4 is a flow chart for explaining the process in the access router shown in FIG. 2 and FIG. 3.

FIG. 4 is a flow chart for explaining the process in access router 20a that is shown in FIG. 2 and FIG. 3.

When mobile terminal 10a moves from home core network 31a that is under the jurisdiction of home agent 30a that has been established by the communication provided with which mobile terminal 10a is contracted or from another access network to access network 21a that is under the jurisdiction of access router 20a, the prefix of the IP address of access router 20a and the MAC address of mobile terminal 10a are used in position registration process unit 47 of access router 20a to first generate care-of address "CoA1" for mobile terminal 10a. The combination of the home address "HoA1" and care-of address "CoA1" of mobile terminal 10a are then transmitted to home agent 30a to perform a position registration request (BU), and further, the home address "HoA1" of mobile terminal 10a and the care-of address "CoA1" for mobile terminal 10a are registered in association with each other in an internal memory (not shown). The home address "HoA1" of mobile terminal 10a is further registered in home agent 30a that has been established by the communication provider with which mobile terminal 10a is contracted.

Further, in Step S1, the number of messages that are transmitted and received between home agents 30a and 30b when performing the above-described position registration of mobile terminal 10a; the number of messages that are exchanged when carrying out path optimization and transmitting/receiving IP packets with access router 20b by way of the transmission/reception route that results from path optimization; the number of control messages that are generated for transmitting/receiving IP packets by mobile terminal 10a; and the presence or absence of reverse tunneling that is set by the operator policies of the communication provider that has established home agent 30a are each maintained in processing cost calculation unit 42 as processing cost calculation table {Lx}. The processing in this Step S1 is carried out together with updating in Step S2 of the number of messages that are transmitted and received between home agents 30a and 30b when performing position registration and the number of messages that are exchanged when performing path optimization to transmit and receive IP packets with access router 20b by way of the transmission/reception route realized by path optimization. This processing cost calculation table {Lx} is set for each mobile terminal that transmits and receives IP packets within access network 21a.

In Step S3, moreover, routing process unit 50 maintains, as address information 43, the IP addresses of home agent 30a that is established by the communication provider with which mobile terminal 10a has contracted and all access routers and home agents that have been established by communication providers that cooperate with this communication provider, i.e., home agents 30a and 30b and access router 20b in the present embodiment. The processing in this Step S3 is carried out together with updating of the IP addresses of home agents 30a and 30b and access router 20b or with updating of home agent 30a with which mobile terminal 10a has contracted and home agents and access routers that have been established by communication providers that cooperate with this communication provider in Step S4.

In Step S5, routing protocol in routing process unit 50 is used by path cost acquisition unit 46 to obtain the number of hops of neighboring paths. In the present embodiment, the routing protocol in routing process unit 50 is used to obtain each of the number of hops between access router 20a and home agent 30a, between home agents 30a and 30b, between access router 20a and home agent 30b, between home agent 30b and access router 20b, and between access routers 20a and 20b. These numbers of hops can conceivably be set in advance as static values by path cost acquisition unit 46. Alternatively, information on routing costs in home agents 30a and 30b is acquired in path cost acquisition unit 46.

When IP packets are subsequently transmitted from mobile terminal 10a to mobile terminal 10b in Step S6, if the number of hops of the path from mobile terminal 10a to mobile terminal 10b has still not been acquired in path cost acquisition unit 46 in Step S7, the routing protocol in routing process unit 50 is used to acquire the number of hops in the path from mobile terminal 10a to mobile terminal 10b, and further, the headers of IP packets that are transmitted from mobile terminal 10a are analyzed to distinguish the type of application that is used in mobile terminal 10a, and packet size is then calculated that is determined according to the type of this application. This information on the number of hops that has been acquired, the calculated packet size, and information of the routing costs in home agents 30a and 30b that was acquired in Step S5 is maintained as path cost calculation table {Rx} for calculating path costs. This path cost calculation table {Rx} is set for each mobile terminal that transmits and receives IP packets in access network 21a.

Then, by means of the path optimization sequence in path optimization process unit 48, upon receiving the position registration message of mobile terminal 10b in Step S8 for IP packets that have been transmitted from mobile terminal 10a, this message being composed of the combination of the home address "HoA2" of mobile terminal 10b and the care-of address "CoA2" of mobile terminal 10b, from access router 20b that presides over access network 21b in which the communication partner mobile terminal 10b is present, HoA/CoA information table 44 is created in Step S9, this table being composed of home address "HoA1" of mobile terminal 10a, care-of address "CoA1" for mobile terminal 10a, home address "HoA2" of mobile terminal 10b, and care-of address "CoA2" for mobile terminal 10b.

Next, in Step S10, the address of home agent 30b that has been established by the communication provider that is contracted with the communication partner mobile terminal 10b and the address of access router 20b that presides over access network 21b in which mobile terminal 10b is present are obtained from HoA/CoA information table 44 and the address information 43 of home agents 30a and 30b and access router 20b. The home address "HoA2" of mobile terminal 10b is registered in home agent 30b that has been established by the communication provider that is contracted with the communication partner mobile terminal 10b.

In Step S11, based on the addresses of home agent 30b and access router 20b that were acquired in Step S10, path cost acquisition unit 46 next uses information of the relevant path in the above-described path cost calculation table {Rx} and weighting coefficients that are determined in advance by home agent 30a to calculate the path costs when transmitting and receiving IP packets from mobile terminal 10a to mobile terminal 10b by way of home agents 30a and 30b and the path costs when path optimization is carried out to transmit and receive IP packets without passing by way of home agents 30a and 30b.

Next, in processing cost calculation unit 42, the number of messages that is maintained as processing cost calculation table {Lx} and weighting coefficients that are determined in advance by home agent 30a are used to calculate the processing costs when transmitting and receiving IP packets from mobile terminal 10a to mobile terminal 10b by way of home agents 30a and 30b and the processing costs when the path optimization is carried out to transmit and receive IP packets that do not pass by way of home agents 30a and 30b. In Step S12, cost comparison operation unit 45: checks for the presence or absence of reverse tunneling that is maintained as processing cost calculation table {Lx}; compares the cost obtained by adding the path costs and processing costs when transmitting and receiving IP packets from mobile terminal 10a to mobile terminal 10b by way of home agents 30a and 30b with the cost obtained by adding the path costs and processing costs when path optimization is carried out to transmit and receive IP packets without passing by way of home agents 30a and 30b; and selects the path having the lowest cost.

In Step S13, routing process unit 50 implements routing control such that the transmission and reception of IP packets between mobile terminals 10a and 10b is carried out by way of the path that was selected in Step S12. In this way, IP packets that are transmitted from mobile terminal 10a are encapsulated by care-of addresses "CoA1" and "CoA2" in encapsulation/decapsulation process unit 49 to be transferred to the path selected in Step S12, and IP packets that are transmitted in from mobile terminal 10b have encapsulation removed by encapsulation/decapsulation process unit 49 to be transferred to mobile terminal 10a as IP packets in accordance with home addresses "HoA1" and "HoA2."

In the event of a subsequent change of the transmission origin address and transmission destination address or transmission destination port of the IP packets, i.e., in the present embodiment, if the transmission destination of IP packets that are transmitted from mobile terminal 10a changes from mobile terminal 10b or if the transmission destination of the IP packets changes from mobile terminal 10a, the processing in the above-described Steps S7-S12 is repeated.

Explanation next regards a specific example of the mobile communication control method in the mobile communication system described above.

Figures 5A, 5B:
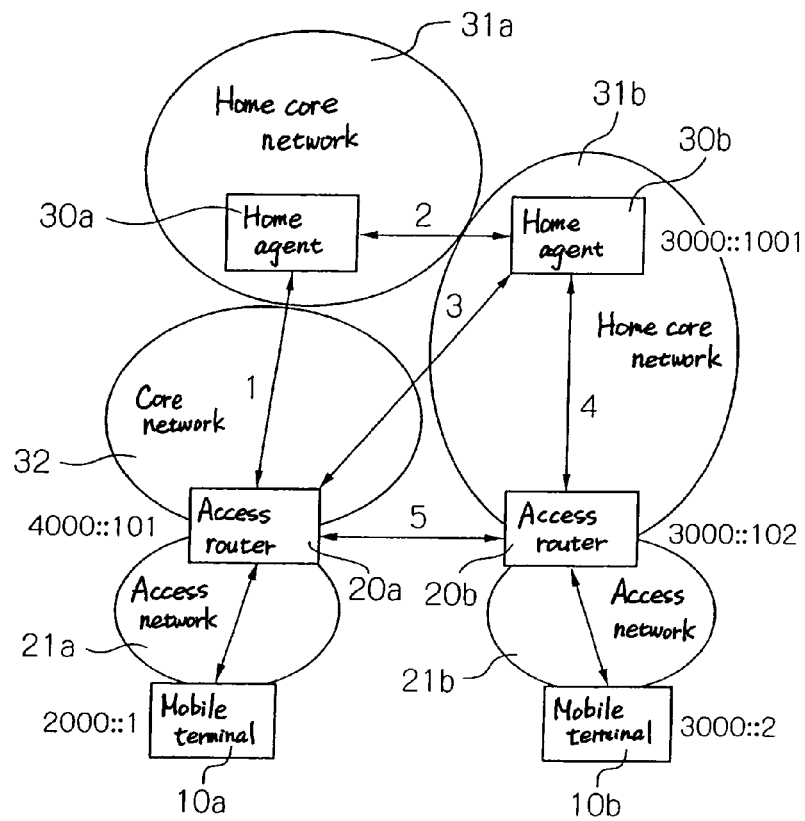
FIG. 5a shows the system configuration for explaining an actual example of the mobile communication control method in the mobile communication system shown in FIG. 2 and FIG. 3.
FIG. 5b shows the HoA/CoA information table in the access router shown in FIG. 5a and the addresses of home agents and access routers that are acquired from this information table.

FIG. 5a is for explaining a specific example of the mobile communication control method in the mobile communication system that is shown in FIG. 2 and FIG. 3. FIG. 5b shows HoA/CoA information table 44 in access router 20a that is shown in FIG. 5a and the addresses of home agent 30b and access router 20b that are obtained from this table.

As shown in FIG. 5a, in this specific example, as with the case shown in FIG. 2, two home agents 30a and 30b are established, each having a respective home core network 31a and 31b. Communication is realized by transmitting and receiving packets between mobile terminals 10a and 10b, mobile terminal 10a being contracted with the communication provider that has established home agent 30a and home agent 30a managing the movement information of mobile terminal 10a, and mobile terminal 10b being contracted with the communication provider that has established home agent 30b and home agent 30b managing the movement information of mobile terminal 10b. Mobile terminal 10a is present in access network 21a that is under the jurisdiction of access router 20a. Mobile terminal 10b is present in access network 21b that is under the jurisdiction of access router 20b. The home address of mobile terminal 10a is "2000::1" and the home address of the communication partner mobile terminal 10b is "3000::2." The address of home agent 30a that is established by the communication provider with which mobile terminal 10b is contracted is "3000::1001." In addition, access router 20a has as its own IP address the care-of address "4000::101" for mobile terminal 10a that is present in access network 21a over which access router 20a has jurisdiction. Access router 20b has as its own IP address the care-of address "3000::102" for mobile terminal 10b that is present in access network 21b over which access router 20b has jurisdiction.

As shown in FIG. 5b, an HoA/CoA information table of mobile terminal 10a is created by means of the process in Step S9 shown in FIG. 4, this HoA/CoA information table being composed of: the home address "2000::1" of mobile terminal 10a, the care-of address "4000::101" for mobile terminal 10a, the home address "3000::2" of mobile terminal 10b, which is the communication partner, and the care-of address "3000::102" for mobile terminal 10b. In addition, the address "3000::1001" of home agent 30b that is established by the communication provider with which the communication partner mobile terminal 10b is contracted and the address "3000::

102" of access router 20b that presides over access network 21b in which mobile terminal 10b is present are acquired by means of the process in Step S10 shown in FIG. 4.

FIG. 6a shows path cost calculation table {Rx} for calculating path costs of mobile terminal 10a for each of the paths shown in FIG. 5a. FIG. 6b shows processing cost calculation table {Lx} for calculating the processing costs of mobile terminal 10a for each of the paths shown in FIG. 5a. In this example, explanation regards a case of using VoIP of 20 ms intervals at Codec G.711 64 KBPS in mobile terminal 10a.

As shown in FIG. 6a, in the present example, the number of hops is 800 (hops), the packet size is 260 (B), and the routing cost of home agent 30a is 300 for route 1 from access router 20a to home agent 30a. For route 2 between home agents 30a and 30b shown in FIG. 5a, the number of hops is 550 (hops), and the packet size is 220 (B). For route 3 from access router 20a as far as home agent 30b shown in FIG. 5a, the number of hops is 900 (hops), the packet size is 244 (B), and the routing cost of home agent 30b is 300. For route 4 from home agent 30b as far as access router 20b shown in FIG. 5a, the number of hops is 200 (hops), the packet size is 260 (B), and the routing cost of home agent 30a is 300. For route 5 between access routers 20a and 20b shown in FIG. 5a, the number of hops is 650 (hops), and the packet size is 268 (B). The packet size, being a value that depends on the application used by the mobile terminal, is set to "0" for cases in which a plurality of applications is used at the same time or in which estimation is not possible.

As shown in FIG. 6b, the number of control messages is "4" when IP packets are transmitted by way of home agents 30a and 30b in the present example, i.e., when IP packets are transmitted by way of routes 1, 2, and 4 or routes 3 and 4 shown in FIG. 5a. Alternatively, the number of control messages is "14" when path optimization is carried out, i.e., when IP packets are transmitted by way of route 5 in FIG. 5a. In addition, reverse tunneling is set to "present" in the communication provider with which mobile terminal 10a is contracted. Thus, in the present example, of the two routes in which IP packets are transmitted by way of home agents 30a and 30b, the route that passes by way of routes 1, 2, and 4 is selected ("○" symbol in the figure).

Using the above-described path cost calculation table {Rx}, the path costs when transmitting and receiving IP packets from mobile terminal 10a to mobile terminal 10b by way of home agents 30a and 30b and the path costs when carrying out path optimization to transmit and receive IP packets that do not pass by way of home agents 30a and 30b are each calculated based on the following equation:

path cost $Rx = r_0 \times$(number of hops)$+ r_1 \times$(packet size) $+ K$(routing cost of home agent (a constant))

Because reverse tunneling is set to "present" in processing cost calculation table {Lx} in the present example, path cost Rx1 by way of routes 1, 2 and 4 and path cost Rx2 by way of route 5 shown in FIG. 5a are each calculated. In addition, the weighting coefficient $r_0$ of the number of hops and the weighting coefficient $r_1$ of the packet size are each set in advance in home agent 30a, these coefficients being assumed to be $r_0=1$ and $r_1=1$ in the present example. In addition, K is a value that represents the routing cost of a home agent and is typically a constant.

$Rx1 = 1 \times (800+550+200) + 1 \times (260+220+260) + (300+0+300) = 2890$ $Rx2 = 1 \times 650 + 1 \times 268 + 0 = 918$ The processing cost Lx1 for transmitting and receiving IP packets from mobile terminal 10a to mobile terminal 10b by way of home agents 30a and 30b and the processing cost Lx2 for performing path optimization to transmit and receive IP packets without passing by way of home agents 30a and 30b are each calculated based on the following equations by referring to processing cost calculation table {Lx}.

Processing cost $Lx = I_0 \times$(number of control messages)

The weighting coefficient $I_0$ of the number of control messages is set in advance, and in the present example, $I_0$ is assumed to be "200."

$Lx1 = 200 \times 4 = 800$ $Lx2 = 200 \times 14 = 2800$

The path costs and processing costs that have been calculated as described above are added for each path, and the path having the lowest cost is selected.

$Rx1 + Lx1 = 2890 + 800 = 3690$ $Rx2 + Lx2 = 918 + 2800 = 3718$

The cost when transmitting and receiving IP packets from mobile terminal 10a to mobile terminal 10b by way of home agents 30a and 30b is therefore less than the cost when performing path optimization to transmit and receive IP packets without passing by way of home agents 30a and 30b, and the path from mobile terminal 10a to mobile terminal 10b that passes by way of home agents 30a and 30b, i.e., the path that passes by way of routes 1, 2, and 4 shown in FIG. 5a, is therefore selected, and routing control is implemented such that IP packets are transmitted and received by way of this path. In other words, IP packets addressed to mobile terminal 10b that are transmitted from mobile terminal 10a are encapsulated in access router 20a with the issue origin address as "4000::101," which is the care-of address of mobile terminal 10a, and the IP address of home agent 30a as the destination address.

In this specific example, path costs are calculated using the three calculation indices: the number of hops on the path by which IP packets are transmitted and received, the routing costs in home agents 30a and 30b, and the packet sizes that are determined according to the applications that are used by mobile terminals 10a and 10b, but path costs may also be calculated using at least one of these calculation indices.

As for the processing costs, apart from calculation that uses the sequential specified total message number of control messages as a calculation index, calculation that uses the sequential specified total byte number of control messages, the unit time byte number, and the unit time message number can be considered, and processing costs can be calculated using at least one of these indices.

Alternatively, rather than using only the sequential specified total message number of control messages to calculate processing costs, calculation of processing costs that uses the sequential specified total message number and the session data size can also be considered. This is because, when transmitting and receiving IP packets by a path that does not pass by way of home agents 30a and 30b, Mobile Cookie or Nonce Index for Return Routability becomes necessary in addition to IP address information as the session data with the communication partner, and the processing costs attendant to paths that pass by way of home agents 30a and 30b differ greatly from processing costs for paths that do not pass by way of home agents 30a and 30b. In this case, as when calculating path costs, processing costs are calculated by multiplying each of the sequential specified total message number of control messages and the session data size by respective weighting coefficients according to the applications that are used in mobile terminals 10a and 10b.

Second Embodiment

In the above-described first embodiment, the weighting coefficients that were used when calculating the processing costs in processing cost calculation unit 42 and the weighting coefficient that was used when calculating path costs in path cost acquisition unit 46 were fixed values that were determined in advance in home agent 30a, but alteration of these weighting coefficients in accordance with the type of applications that are used in mobile terminal 10a can also be considered.

Figure 7:
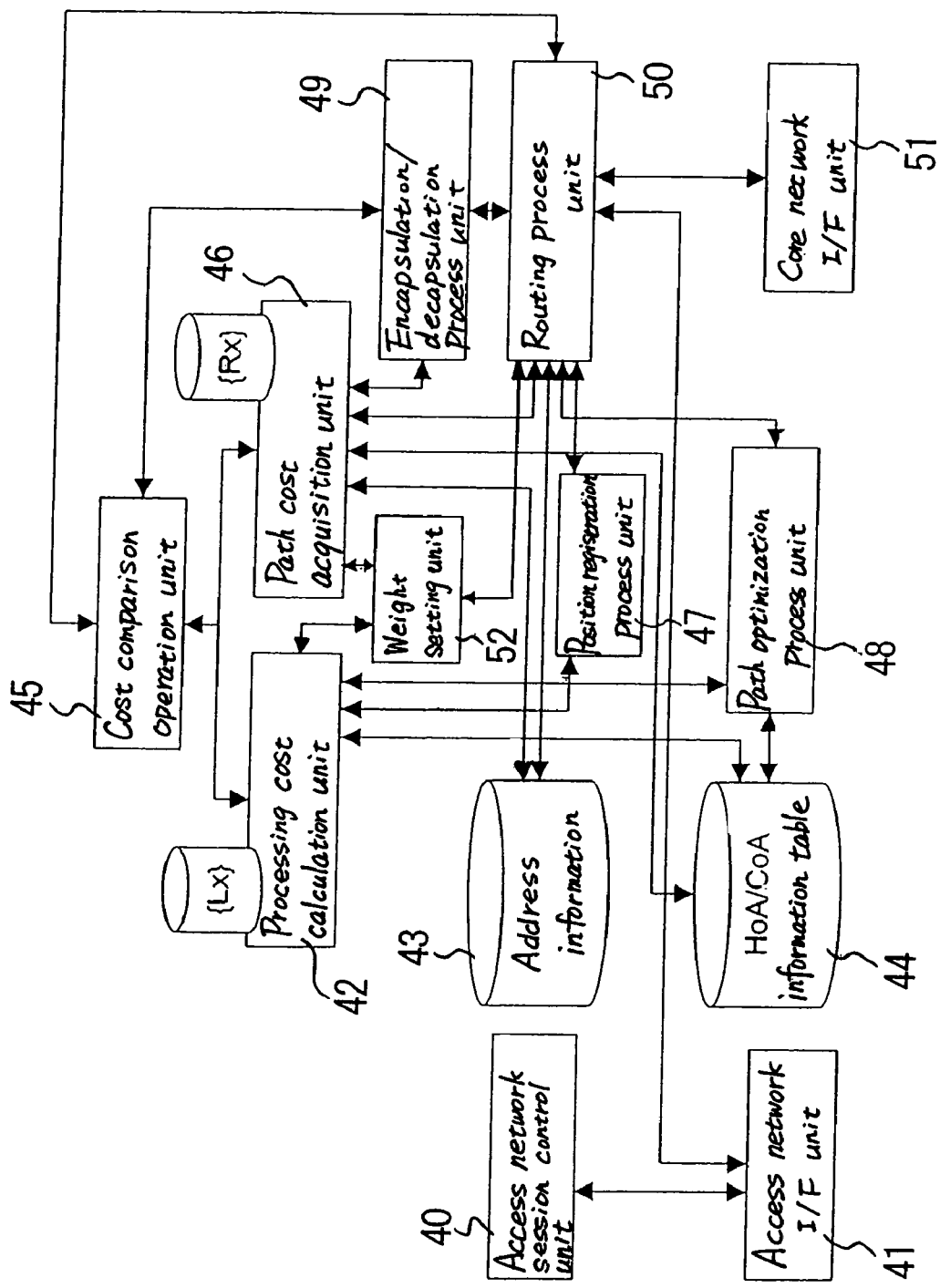
FIG. 7 is a block diagram showing the second embodiment of the access router shown in FIG. 2.

FIG. 7 is a block diagram showing the second embodiment of access router 20a shown in FIG. 2.

As shown in FIG. 7, access router 20a in this embodiment differs from the form shown in FIG. 3 only in the provision of weight setting unit 52 for setting the weighting coefficients that are used in calculating the processing cost in processing cost calculation unit 42 and the weighting coefficients used in calculating the path cost in path cost acquisition unit 46 according to the type of applications used in mobile terminal 10a.

When access router 20a having a configuration such as shown in FIG. 7 is used in transmitting IP packets from mobile terminal 10a to mobile terminal 10b, the type of application being used in mobile terminal 10a is distinguished in weight setting unit 52 and the weighting coefficients then set according to this type.

The weighting coefficients $r_0$ and $r_1$ that are set in weight setting unit 52 are then used to calculate the path costs in path cost acquisition unit 46 as previously described, and weighting coefficient $I_0$ that is set in weight setting unit 52 is used to calculate the processing costs in processing cost calculation unit 42 as previously described.

The following explanation regards the mobile communication control method in the mobile communication system when using access router 20a having a configuration such as shown in FIG. 7 using the examples shown in FIGS. 5a and 5b and FIGS. 6a and 6b.

In Step S7 shown in the first embodiment, if the result of distinguishing the type of application being used in mobile terminal 10a by analyzing the header of the IP packets transmitted from mobile terminal 10a reveals that the application being used in mobile terminal 10a is, for example, VoIP of 20-ms intervals at Codec G 711 64 KBPS, the weighting coefficient $r_0$ of the number of hops is increased because delay is preferably reduced in VoIP. Using the example shown in FIGS. 5a and 5b and FIGS. 6a and 6b as an example, the weighting coefficient $r_0$ of the number of hops is "2," the weighting coefficient $r_1$ of the packet size is "1," and the weighting coefficient $I_0$ of the control message number is 200.

Then, using the path cost calculation table {Rx} such as shown in FIG. 6a, the path costs Rx1 when transmitting and receiving IP packets from mobile terminal 10a to mobile terminal 10b by way of home agents 30a and 30b and the path costs Rx2 when performing path optimization to transmit and receive IP packets without passing by way of home agents 30a and 30b are each calculated in the same way as described in the first embodiment.

$Rx1=2\times(800+550+200)+1\times(260+220+260)+(300+0+300)=4440$ $Rx2=2\times650+1\times268+0=1568$ The processing cost Lx1 when transmitting and receiving IP packets from mobile terminal 10a to mobile terminal 10b by way of home agents 30a and 30b and the processing cost Lx2 when implementing path optimization to transmit and receive IP packets without passing by way of home agents 30a and 30b are each calculated by referring to processing cost calculation table {Lx} such as shown in FIG. 6b, as in the calculation described in the first embodiment.

$Lx1=200\times4=800$ $Lx2=200\times14=2800$

The path costs and processing cost that have been calculated as described above are then added for each path and the path having the lowest cost is selected.

$Rx1+Lx1=4440+800=5240$ $Rx2+Lx2=1568+2800=4368$

The costs when transmitting and receiving IP packets from mobile terminal 10a to mobile terminal 10b by way of home agents 30a and 30b are higher than the costs when path optimization is implemented to transmit and receive IP packets without passing by way of home agents 30a and 30b, whereby the path from mobile terminal 10a to mobile terminal 10b that does not pass by way of home agent 30a and 30b, i.e., the path by way of route 5 shown in FIG. 5a, is selected and routing control implemented such that IP packets are transmitted and received by way of this path. In other words, IP packets that are transmitted from mobile terminal 10a and addressed to mobile terminal 10b are encapsulated in access router 20a with the origination address as "4000::101," which is the care-of address of mobile terminal 10a, and the destination address as "3000::102," which is the care-of address of mobile terminal 10b, and then transmitted.

Thus, when VoIP, which does not permit delays, is used in mobile terminal 10a, the hop number weighting coefficient $r_0$ can be increased to realize maximum shortening of the communication path and maximum reduction of delay. In addition, by increasing the control message weighting coefficient $I_0$ when using an application such as email in which the time for transmitting and receiving user data is shorter than the time for transmitting and receiving control messages, or by increasing the hop number weighting coefficient $r_0$ when using an application such as VoD (Video on Demand) in which the time for transmitting and receiving user data is especially long, the optimum path can be selected according to the application that is being used by mobile terminal 10a.

Third Embodiment

In the present invention as described hereinabove, HoA/CoA information tables 44 are created in access routers 20a and 20b for each mobile terminal that is the transmission origin of IP packets, these HoA/CoA information tables 44 being composed of the home address of the mobile terminal, the care-of address for that mobile terminal, the home address of the communication partner mobile terminal, and the care-of address for the mobile terminal that is the communication partner, but the shared use of the above-described path cost calculation table {Rx} and processing cost calculation table {Lx} in accordance with the information in these HoA/CoA information tables 44 can also be considered.

Figures 8A, 8B:
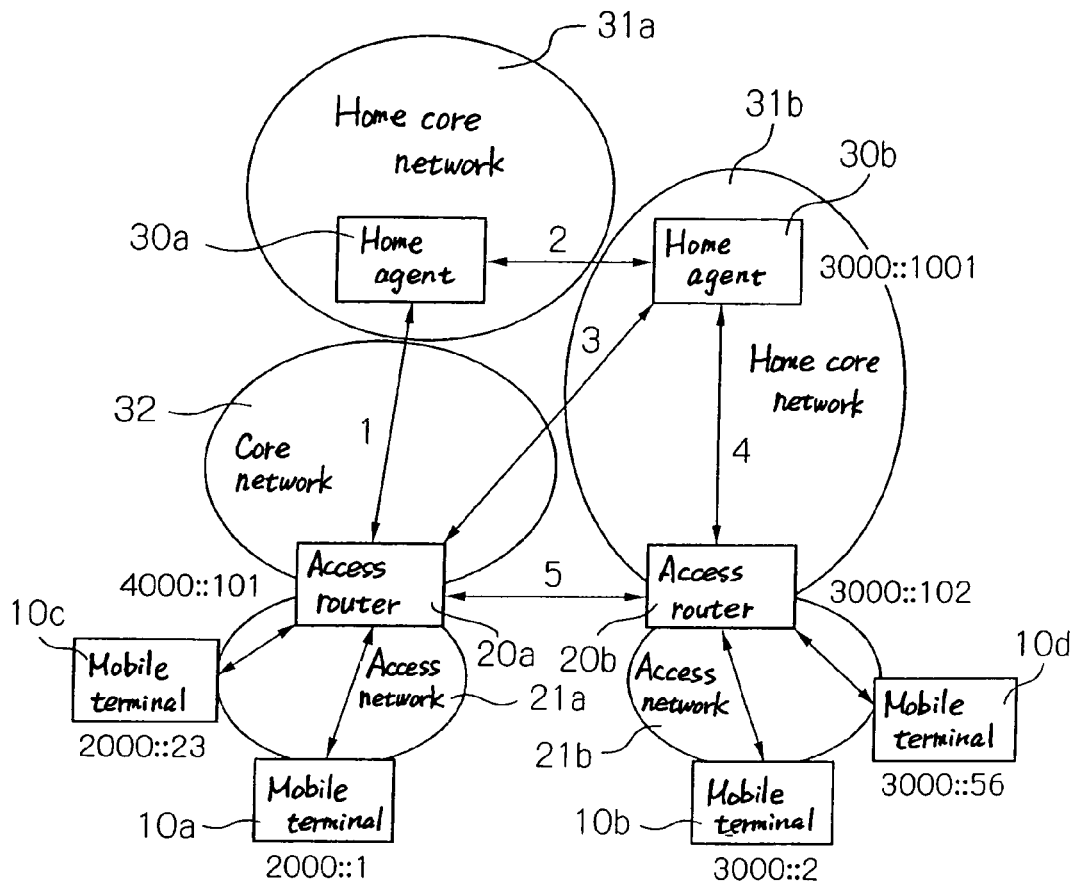

FIG. 8a shows the system configuration for explaining the third embodiment of the mobile communication system of the present invention. FIG. 8b shows the HoA/CoA information table in access router 20a shown in FIG. 8a.

As shown in FIG. 8a, two home agents 30a and 30b each having a respective home core network 31a and 31b are provided in the present embodiment, as with the embodiment shown in FIG. 5a. Communication is then realized by the transmission and reception of packets between mobile terminal 10a, which contracts with the communication provider that has established home agent 30 and for which movement information is managed by home agent 30a, and mobile terminal 10b, which contracts with the communication provider that has established home agent 30b and for which movement information is managed by home agent 30b. Mobile terminal 10a is present in access network 21a that is under the jurisdiction of access router 20a, and mobile terminal 10b is present in access network 21b that is under the jurisdiction of access router 20b. In addition, the home address of mobile terminal 10a is "2000::1" and the home address of mobile terminal 10b that is the communication partner is "3000::2." The address of home agent 30b that is established by the communication provider with which mobile terminal 10b is contracted is "3000::1001" and access router 20a has as its own IP address the care-of address "4000::101" for mobile terminal 10a that is present in access network 21a under its jurisdiction. Access router 20b has as its own IP address the care-of address "3000::102" for mobile terminal 10b that is present in access network 21b that is under the jurisdiction of access router 20b.

As shown in FIG. 8b, a HoA/CoA information table of mobile terminal 10a is created by means of the process in Step S9 shown in FIG. 4, this HoA/CoA information table being composed of: the home address "2000::1" of mobile terminal 10a, the care-of address "4000::101" for mobile terminal 10a, the home address "3000::2" of mobile terminal 10b that is the communication partner, and the care-of address "3000::102" for mobile terminal 10b.

In this state, when mobile terminal 10c, which contracts with the communication provider that has established home agent 30a and for which movement information is managed by home agent 30a, moves to access network 21a that is under the jurisdiction of access router 20a as shown in FIG. 8a, the prefix of the IP address of access router 20a and the MAC address of mobile terminal 10c are used in access router 20a to generate care-of address "4000::201" for mobile terminal 10c. Access router 20a further executes a path optimization sequence with mobile terminal 10d, which is the communication partner of mobile terminal 10c, and creates a HoA/CoA information table of mobile terminal 10c such as shown in FIG. 8b.

In this case, mobile terminals 10a and 10c both contract with the communication provider that has established home agent 30a, and the subnet "2000" of the home addresses of these mobile terminals is therefore identical ("○" mark in the figure). In addition, the communication partners of mobile terminals 10a and 10c are mobile terminals 10b and 10d, respectively, and these mobile terminals 10b and 10d both contract with the communication provider that has established home agent 30b and the subnet "3000" of the home addresses of these mobile terminals is therefore identical ("○" mark in the figure). Further, mobile terminals 10b and 10d that are the communication partners of mobile terminals 10a and 10c, respectively, are both present in access network 21b that is under the jurisdiction of access router 20b, and the subnet "3000" of the care-of addresses of these mobile terminals is therefore identical ("○" mark in the figure). When the subnets of the home address of the mobile terminal that is the transmission origin and the home address and care-of address of the mobile terminal that is the communication partner are the same in this way for the set of two mobile terminals that transmit and receive IP packets, the IP packets are transmitted and received by way of the same path.

Following the preparation of the HoA/CoA information table in the present embodiment, when a set exists for which the subnet of the home address of the mobile terminal that is the transmission origin and the home address and care-of address of the mobile terminal that is the communication partner are identical for a set of two mobile terminals that transmit and receive IP packets, the path cost calculation table {Rx} and the processing cost calculation table {Lx} for the mobile terminal of this set that is the transmission origin are used to calculate the path costs and processing costs and select the path. In the case that is shown in FIG. 8, for example, the subnet of the home address of mobile terminal 10c is the same as the subnet of the home address of mobile terminal 10a, and as a result, the HoA/CoA information table of mobile terminal 10a is first consulted, and because the subnet of the home address of mobile terminal 10d, which is the communication partner of mobile terminal 10c, is the same as the subnet of the home address of mobile terminal 10b, which is the communication partner of mobile terminal 10a, and moreover, the subnet of the care-of address of mobile terminal 10d, which is the communication partner of mobile terminal 10c, is the same as the subnet of the care-of address of mobile terminal 10b, which is the communication partner of mobile terminal 10a, the path cost calculation table {Rx} and the processing cost calculation table {Lx} such as shown in FIGS. 6a and 6b are used to select the transmission and reception path of IP packets between mobile terminal 10c and mobile terminal 10d. The application that is used in mobile terminal 10a is not necessarily the same as the application that is used in mobile terminal 10c, and the packet size weighting coefficient $r_1$ in path cost calculation table {Rx} is therefore set to "0."

In selecting the path by which IP packets are transmitted and received, when a set exists in HoA/CoA information table 44 in which the subnets of the home addresses of the mobile terminals that are the transmission origins of IP packets are the same and the subnets of the home addresses and care-of addresses of the mobile terminals that are the communication partners are the same, using the path cost calculation table {Rx} and processing cost calculation table {Lx} of the mobile terminals of this set that are the transmission origins of IP packets can both eliminate the need for the process to create a path cost calculation table {Rx} and processing cost calculation table {Lx} and also improve the efficiency of memory utilization.

Another Embodiment

When performing position registration of mobile terminal 10a in the above-described embodiments, the number of messages that are transmitted and received between home agents 30a and 30b and the number of messages that are exchanged when transmitting and receiving IP packets with access router 20b by way of transmission/reception routes realized by carrying out path optimization are each maintained as processing cost calculation table {Lx}, but it also possible to consider a form in which, for example, when carrying out VoIP communication that does not allow delay or loss, the number of bycast sessions at the time of handover and the number of buffering sessions are each maintained as processing cost calculation table {Lx}, and each value is then multiplied by a weighting coefficient and added when calculating processing costs.

Alternatively, when the above-described embodiments are realized by a hierarchical mobile IP (HMIP), MAP (Mobile Application Parts) are interposed between access routers 20a and 20b and home agents 30a and 30b, but the above-described cost calculation can still be realized in a state that includes MAP.

In the above-described embodiments, according to one form that can be considered, the process for selecting a path in accordance with path costs and processing costs is not necessarily carried out when transmitting and receiving IP packets in access routers 20a and 20b. As an alternative, when contracting with the communication providers, the users of mobile terminals 10a and 10b designate whether to carry out processing in accordance with the type of applications used by the users, and the above-described path selection according to path costs and processing costs is then carried out only when the designated applications are being used in mobile terminals 10a and 10b. For example, it is possible to request that processing for selecting a path according to path costs and processing costs be carried out only when electronic mail is being received in mobile terminal 10a, and in access router 20a, processing for selecting a path according to path costs and processing costs is carried out only during the reception of electronic mail in mobile terminal 10a.

In addition to a form in which processing is realized by the above-described dedicated hardware in access routers 20a and 20b, the present invention may also be realized by recording a program for carrying out these functions on a recording medium that can be read by access routers 20a and 20b and causing access routers 20a and 20b to read and execute the program that is recorded on this recording medium. A recording medium that is readable by access routers 20a and 20b refers to a movable/installable recording medium such as a magneto-optic disk, DVD, or CD, or a hard disk drive that is incorporated in access routers 20a and 20b. The program that is recorded in this recording medium is read to a control block and processes equivalent to those described above then carried out by control of the control block.

While a preferred embodiment of the present invention has been described using specific terms, such description is for illustrative purposes only, and it is to be understood that changes and variations may be made without departing from the spirit or scope of the following claims.

What is claimed is:

1. A mobile communication control method for implementing the transmission and reception of packets of a mobile terminal for which movement information is managed by a control device; said mobile communication control method comprising processes of:
    calculating path costs that result from data-related factors for transmitting and receiving packets on each of paths that pass by way of said control device and paths that do not pass by way of said control device;
    calculating processing costs that result from control-related factors for transmitting and receiving packets on each of paths that pass by way of said control device and paths that do not pass by way of said control device;
    adding said path costs and processing costs for each of paths that pass by way of said control device and paths that do not pass by way of said control device and selecting the path for which the added cost is lowest; and
    using said selected path to transmit and receive packets.

2. A mobile communication control method according to claim 1, wherein said path costs are calculated using at least one calculation index among three calculation indices:
    a number of hops in a path on which packets are transmitted and received,
    routing costs in a control device that exists on a relevant path, and
    packet size determined according to an application used in said mobile terminal.

3. A mobile communication control method according to claim 2, further comprising a process of:
    multiplying a weighting coefficient for each calculation index for calculating said path costs;
    wherein a calculation index that is multiplied with said weighting coefficient is used to calculate said path costs.

4. A mobile communication control method according to claim 2, further comprising a process of:
    maintaining said calculation indices for a mobile terminal that transmits and receives packets with another mobile terminal by way of one routing device;
    wherein, when a mobile terminal having a characteristic address of a subnet that is identical to a subnet of a characteristic address of said mobile terminal transmits and receives packets with a mobile terminal having both a characteristic address of a subnet identical to a subnet of a characteristic address of said other mobile terminal and a care-of address of a subnet identical to a subnet of a care-of address that is a movement destination address of said other mobile terminal, said calculation indices for calculating said processing costs that are maintained are used to calculate said path costs and/or said processing costs.

5. A mobile communication control method according to claim 1, wherein
    said processing costs are calculated using at least one calculation index of five calculation indices:
    a sequential specified total message number of control messages,
    a sequential specified total byte number,
    a unit time byte number,
    unit time message number, and
    session data size.

6. A mobile communication control method according to claim 5, further comprising a process of:
    multiplying a weighting coefficient for each calculation index for calculating said processing costs;
    wherein a calculation index that is multiplied with said weighting coefficient is used to calculate said processing costs.

7. A mobile communication control method according to claim 6, further comprising a process of:
    setting each of weighting coefficients for multiplying calculation indices for calculating said path costs and weighting coefficients for multiplying calculation indices for calculating said processing costs according to applications used in said mobile terminal.

8. A mobile communication control method according to claim 1, wherein said path selection according to cost is carried out when a designated application is being used in said mobile terminal.

9. A mobile communication system comprising:
    mobile terminals;
    control devices for managing movement information of said mobile terminals; and
    routing devices each provided with an access network, said routing devices each managing characteristic addresses of mobile terminals that are present in said access network in association with care-of addresses in said access network; encapsulating packets that accord with characteristic addresses of said mobile terminals by said care-of addresses to transfer by one of either paths that pass by way of said control devices or paths that do not pass by way of said control devices, and further, removing encapsulation of packets realized by said care-of addresses of said mobile terminals to transfer to said mobile terminals as packets that accord with said characteristic addresses;

wherein said routing devices select one of paths that pass by way of said control devices and paths that do not pass by way of said control devices in accordance with costs composed of path costs that result from data-related factors for transmitting and receiving packets and processing costs that result from control-related factors for transmitting and receiving packets and transfers encapsulated packets by way of this path.

10. A mobile communication system according to claim 9, wherein said routing device comprises:

path cost acquisition means for calculating said path costs for each of paths that pass by way of said control devices and paths that do not pass by way of said control devices;

processing cost calculation means for calculating said processing costs for each of paths that pass by way of said control devices and paths that do not pass by way of said control devices;

cost comparison operation means for adding path costs that are calculated in said path cost acquisition means and processing costs that are calculated in said processing cost calculation means for each of paths that pass by way of said control devices and paths that do not pass by way of said control devices and selecting a path for which the added cost is lowest; and routing processing means for transferring packets that have been encapsulated to the path that was selected in said cost comparison operation means.

11. A mobile communication system according to claim 10, wherein said path cost acquisition means calculates said path costs using at least one calculation index from among three calculation indices:

a number of hops in paths by which packets are transmitted and received, routing costs in said control devices that exist on said paths, and packet size that is determined according to applications that are used in said mobile terminals.

12. A mobile communication system according to claim 11, wherein said path cost acquisition means multiplies weighting coefficients with the calculation indices for calculating said path costs and calculates said path costs using calculation indices that have been multiplied with said weighting coefficients.

13. A mobile communication system according to claim 11, wherein said routing device: maintains said calculation indices for a mobile terminal that transmits and receives packets with another mobile terminal by way of said routing device; and when a mobile terminal having a characteristic address of a subnet identical to a subnet of a characteristic address of said mobile terminal transmits and receives packets with a mobile terminal having both a characteristic address of a subnet identical to a subnet of a characteristic address of said other mobile terminal and a care-of address of a subnet identical to a subnet of a care-of address of said other mobile terminal, said routing device uses said calculation indices that are maintained to calculate said path costs and/or said processing costs.

14. A mobile communication system according to claim 10, wherein said processing cost calculation means calculates said processing costs using at least one calculation index from among five calculation indices:

a sequential specified total message number of control messages, a sequential specified total byte number, a unit time byte number, unit time message number, and session data size.

15. A mobile communication system according to claim 14, wherein said processing cost calculation means multiplies weighting coefficients with the calculation indices for calculating said processing costs and calculates said processing costs using calculation indices that have been multiplied with said weighting coefficients.

16. A mobile communication system according to claim 15, wherein said routing device includes a weight setting means for setting each of weighting coefficients that are multiplied with calculation indices for calculating said path costs and each of weighting coefficients that are multiplied with calculation indices for calculating said processing costs according to applications that are being used in said mobile terminals.

17. A mobile communication system according to claim 9, wherein said routing device performs said path selection according to cost when a designated application is being used in said mobile terminals.

18. A routing device comprising:

path processing means for managing characteristic addresses of mobile terminals that are present in an access network in association with care-of addresses in said access network;

encapsulation/decapsulation means for encapsulating according to said care-of addresses packets that accord with characteristic addresses of said mobile terminals and removing encapsulation of packets that accords with the care-of addresses of said mobile terminals;

routing means for transferring packets that have been encapsulated in said encapsulation/decapsulation means to either of paths that pass by way of control devices that manage movement information of said mobile terminals or paths that do not pass by way of said control devices;

access network session control means for transferring packets from which encapsulation has been removed by said encapsulation/decapsulation means to said mobile terminals as packets that accord with said characteristic addresses;

path cost acquisition means for calculating path costs that result from data-related factors for transmitting and receiving packets to each of paths that pass by way of said control devices and paths that do not pass by way of said control devices;

processing cost calculation means for calculating processing costs that result from control-related factors for transmitting and receiving packets to each of paths that pass by way of said control devices and paths that do not pass by way of said control devices; and cost comparison operation means for adding path costs that have been calculated in said path cost acquisition means and processing costs that have been calculated in said processing calculation means for each of paths that pass by way of said control device and paths that do not pass by way of said control devices and selecting a path for which the added cost is lowest;

wherein said routing means transfers encapsulated packets to the path selected in said cost comparison operation means.

19. A routing device according to claim 18, wherein said path cost acquisition means calculates said path cost using at least one calculation index from among three calculation indices:
- a number of hops on paths by which packets are transmitted and received,
- routing cost in a control device that is present on said paths, and
- packet size determined by applications that are being used in said mobile terminals.

20. A routing device according to claim 19, wherein said path cost acquisition means multiplies weighting coefficients with calculation indices for calculating said path costs and calculates said path costs using calculation indices that have been multiplied with said weighting coefficients.

21. A routing device according to claim 19, wherein
- said calculation indices are maintained for each of a mobile terminal that transmits and receives packets with another mobile terminal by way of said routing device; and
- when a mobile terminal having a characteristic address of a subnet identical to a subnet of a characteristic address of said mobile terminal transmits and receives packets with a mobile terminal having both a characteristic address of a subnet identical to a subnet of a characteristic address of said other mobile terminal and a care-of address of a subnet identical to a subnet of a care-of address of said other mobile terminal, said calculation indices that are maintained are used to calculate said path costs and/or said processing costs.

22. A routing device according to claim 18, wherein said processing cost calculation means calculates said processing costs using at least one calculation index from among five calculation indices:
- sequential specified total message number of control messages,
- sequential specified total byte number,
- unit time byte number,
- unit time message number, and
- session data size.

23. A routing device according to claim 22, wherein said processing cost calculation means multiplies weighting coefficients with calculation indices for calculating said processing costs and calculates said processing costs using calculation indices that have been multiplied with said weighting coefficients.

24. A routing device according to claim 23, comprising a weight setting means for setting each of weighting coefficients that are multiplied with calculation indices for calculating said path costs and each of weighting coefficients that are multiplied with calculation indices for calculating said processing costs according to applications that are being used in said mobile terminals.

25. A routing device according claim 18, wherein said path selection according to cost is performed when a designated application is being used in said mobile terminals.

26. A non-transitory computer-readable storage medium for storing an executable program, having stored thereon a program for causing a computer to execute processes comprising:
- calculating path costs that result from data-related factors for transmitting and receiving packets in mobile terminals for each of paths that pass by way of control devices that manage movement information of said mobile terminals and paths that do not pass by way of said control devices;
- calculating processing costs that result from control-related factors for transmitting and receiving packets in mobile terminals for each of paths that pass by way of said control devices and paths that do not pass by way of said control devices;
- adding said path costs and said processing costs for each of paths that pass by way of said control devices and paths that do not pass by way of said control devices and selecting a path for which the added cost is lowest; and
- using said selected path to transmit and receive packets.

27. A non-transitory computer-readable storage medium according to claim 26, wherein calculating said path costs comprises using at least one calculation index from among three calculation indices:
- a number of hops on paths by which packets are transmitted and received;
- routing costs in a control devices that exist on said paths; and
- packet size that is determined according to applications that are used in said mobile terminals.

28. A non-transitory computer-readable storage medium according to claim 27 wherein the processes further comprise:
- multiplying weighting coefficients with each calculation index for calculating said path costs, and
- using calculation indices that have been multiplied with said weighting coefficients to calculate said path costs.

29. A non-transitory computer-readable storage medium according to claim 27 wherein the processes further comprise:
- maintaining said calculation indices for each mobile terminal that transmits and receives packets with another mobile terminal by way of one routing device; and
- when a mobile terminal having a characteristic address of a subnet identical to a subnet of a characteristic address of said mobile terminal transmits and receives packets with a mobile terminal having both a characteristic address of a subnet identical to a subnet of a characteristic address of said other mobile terminal and a care-of address of a subnet identical to a subnet of a care-of address that is a movement destination address of said other mobile terminal, using the calculation indices for calculating said processing costs that are maintained to calculate said path costs and/or said processing costs.

30. A non-transitory computer-readable storage medium according to claim 26 wherein calculating said processing costs comprises using at least one calculation index from among five calculation indices:
- sequential specified total message number of control messages,
- sequential specified total byte number,
- unit time byte number,
- unit time message number, and
- session data size.

31. A non-transitory computer-readable storage medium according to claim 30 wherein the processes further comprise:
- multiplying weighting coefficients with each calculation index for calculating said processing costs; and
- using calculation indices that have been multiplied with said weighting coefficients to calculate said processing costs.

32. A non-transitory computer-readable storage medium according to claim 31 wherein the processes further comprise:
- setting each weighting coefficient that is multiplied with a calculation index for calculating said path costs and each weighting coefficient that is multiplied with a calculation index for calculating said processing costs according to applications that are being used in said mobile terminals.

33. A non-transitory computer-readable storage medium according to claim 26 wherein the processes further comprise performing said path selection according to cost when a designated application is being used in said mobile terminals.

* * * * *

UNITED STATES PATENT AND TRADEMARK OFFICE
CERTIFICATE OF CORRECTION

PATENT NO. : 7,773,525 B2  Page 1 of 1
APPLICATION NO. : 11/376236
DATED : August 10, 2010
INVENTOR(S) : Shozo Fujino It is certified that error appears in the above-identified patent and that said Letters Patent is hereby corrected as shown below:

Column 3, Line 50, delete "110a and" insert --110a and 110b--

Signed and Sealed this

Ninth Day of November, 2010

David J. Kappos
*Director of the United States Patent and Trademark Office*